Nov. 13, 1956     E. P. LAUG     2,770,705
LIFTING DEVICE FOR THRIFT COOKER UNIT
Filed Feb. 1, 1954     2 Sheets-Sheet 1
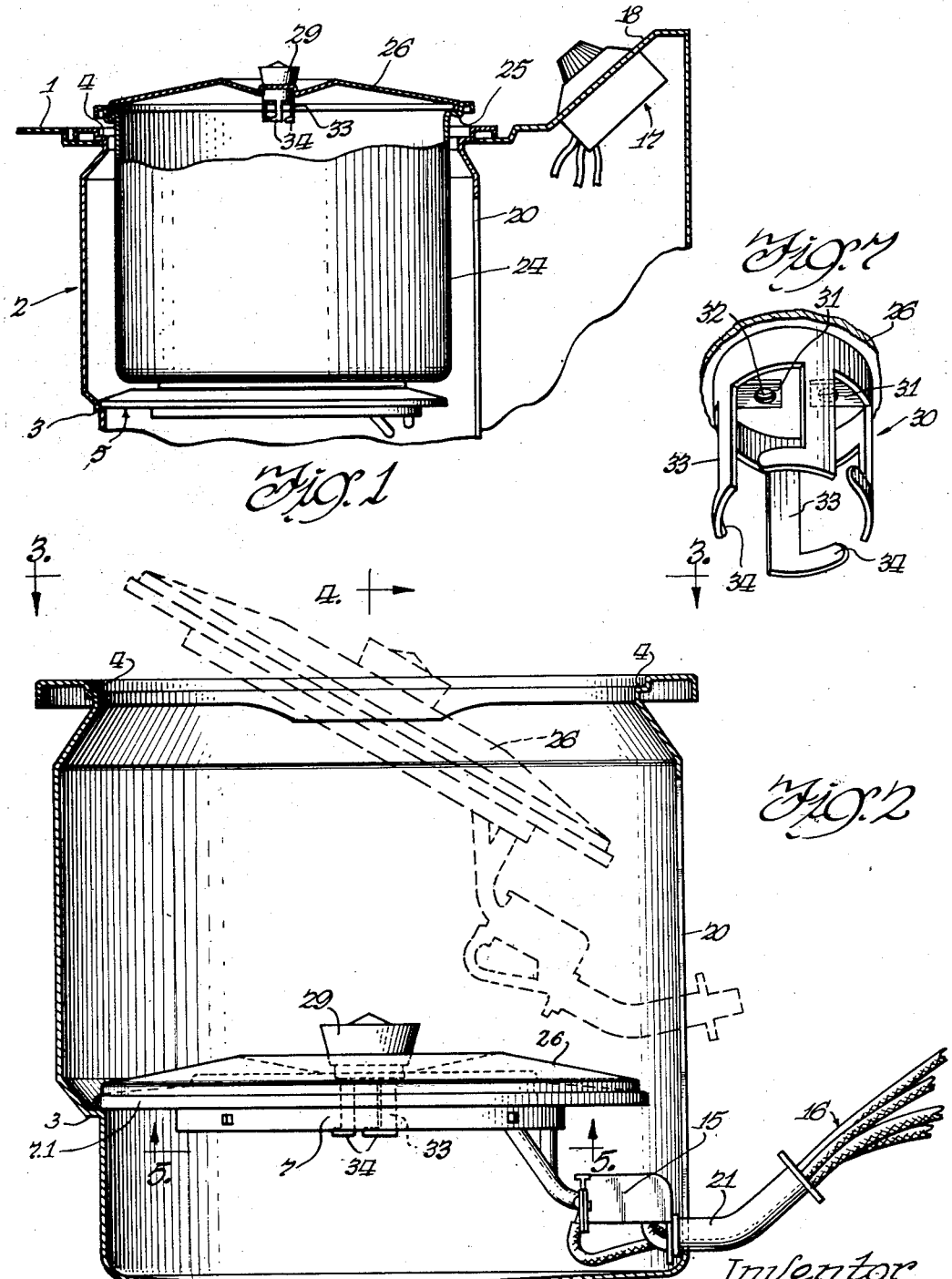
Inventor
Ernst P. Laug

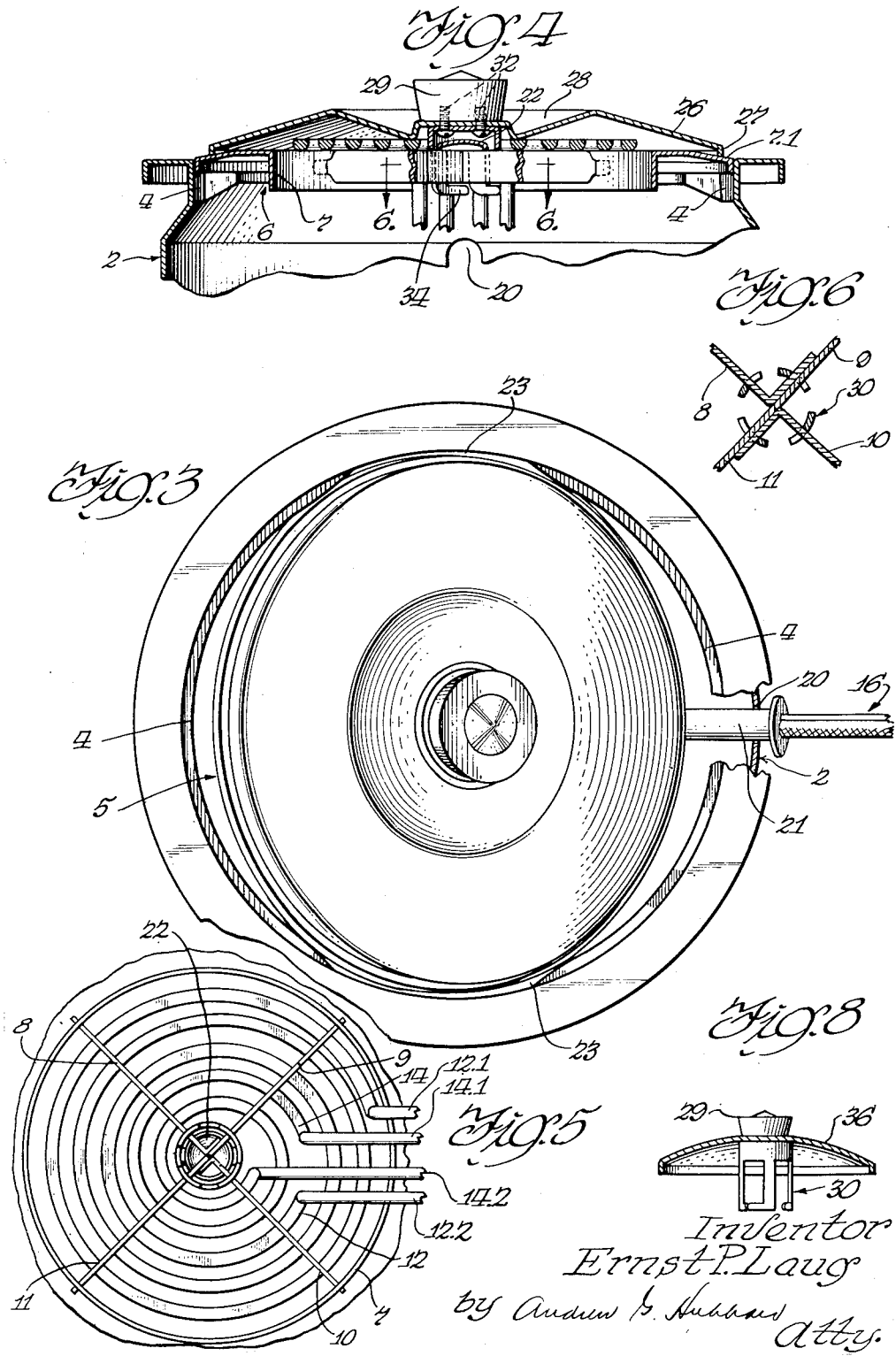

United States Patent Office 2,770,705
Patented Nov. 13, 1956

2,770,705

LIFTING DEVICE FOR THRIFT COOKER UNIT

Ernst P. Laug, Chicago, Ill., assignor to General Electric Company, a corporation of New York Application February 1, 1954, Serial No. 407,517

6 Claims. (Cl. 219—37)

This invention relates to electric ranges of the type having a cooking top provided with a well within which a heating unit is arranged for movement between operative positions respectively within the well and at the top thereof. In particular, the invention relates to a device by means of which the heating unit may be engaged to permit it to be manually moved from one to the other of its operative positions.

Electric ranges of the above noted type are common. One of the advantages of the described heating unit arrangement is that the unit is optionally usable as a deep well cooker or as a surface heating unit. Electric heating units may be dangerously hot even though the heat radiation is below the visible spectrum and users of electric ranges have been burned when they have attempted to move the unit from one to the other position too quickly after it has been in use. Bails and other handle arrangements have been included as part of these deep well heaing units to facilitate the handling thereof, but such a handle must fold into the heating unit to maintain the flat operating surface of the unit and the user is therefore required to reach into the well and fumble for the handle with accompanying possibility of touching a hot portion of the unit. It is also known in the art to provide various mechanical devices to raise and lower the heating units of deep well cookers. Such arrangements are expensive, cumbersome and subject to mechanical failure.

It is therefore a principal object of the present invention to provide a simple device for raising and lowering the heating uinit of a deep well cooker and to provide said device with means which will protect the user against being burned by accidental contact with the unit.

It is another object of the invention to provide a device of the type aforesaid which may be permanently affixed to the lid or cover of a cooking vessel intended for use in the deep well cooker, and thus be always available for use.

In a presently preferred embodiment, I provide a cooking vessel lid with a handle having low heat conductivity and mount on the underside of the lid a device comprising a plurality of rigid hooks extending axially of the cover and arranged to engage portion of the heating unit by simple manipulation. The cooking vessel lid is preferably convex, whereupon when the hook members are being brought into operative association with the heating unit, the user is protected against radiant heat by the lid itself and against conducted heat by the air space provided by the convexity of the lid.

In the accompanying drawings;

Fig. 1 is a fragmentary sectional elevation of a range cooking top having a deep well cooker, and showing the heating unit in its lower position and a cooking vessel thereon;

Fig. 2 is a side sectional elevation of a deep well cooker with the heating unit in its lower position and the lifting device positioned to raise the unit. The broken line shows the heating unit and lifting device during the stage of raising the heating unit to the upper position;

Fig. 3 is a plan view showing the heating unit in substantially the broken line position of Fig. 2;

Fig. 4 is a fragmentary sectional elevation taken on lines 4—4 of Fig. 2 showing the heating unit in raised position and the lifting device still in place;

Fig. 5 is a bottom plan view looking in the direction of 5—5 of Fig. 2;

Fig. 6 is a plan view taken in section on lines 6—6 of Fig. 4;

Fig. 7 is a perspective of the lifting unit; and

Fig. 8 is a side sectional elevation of a second embodiment of lifting unit.

In Fig. 1, the cooking top 1 of an electric cooking range is fragmentarily shown. Said cooking top has suitably fixed within an opening therein a so-called "deep well" cooker, comprising a receptacle 2 having a suitable lower ledge formation 3 and spaced upper ledge formations 4. The lower and upper ledge formations are arranged to support a heating unit 5; in other words, said heating unit is arranged to occupy an operative position carried by ledge 3 in the lower portion of receptacle 2, or an operative position resting upon the ledges 4 at the upper portion of receptacle. The heating unit, as best shown in Fig. 4, comprises a metal support ring 6 having a shot cylindrical portion 7 from which extends the relatively wide flange 7.1. The portion 7 supports a spider having the cruciform-arranged arms 8, 9, 10, and 11, which in turn carry the flat, spirally coiled, tubular sheathed heating elements 12 and 14, as seen in Fig. 5. The respective terminals 12.1 and 12.2 of heating element 12 and terminals 14.1 and 14.2 of heating element 14 enter an insulated terminal block 15, at which connection is made to the flexible range wiring conductors which are collectively identified by the reference numeral 16 in Fig. 2. Said conductors connect to a conventional multi-position switch 17 as is now well known in the art. The switch is conveniently mounted on a backsplash portion 18 of the range cooking top.

A wall portion of the receptacle 2 is provided with a slot 20, along which the conductors travel as the heating unit is moved between its respective upper and lower positions; and to protect the conductor 16 against being damaged by the walls of said slot 20, it is customary to provide the tubular sheath 21, as shown in Figs. 2 and 3. Heating units are ordinarily provided with a center medallion or cap 22 (see Figs. 4 and 5) for partial closure of the otherwise large opening in the center of the heating unit.

This deep well cooker and its arrangement of heating elements and supporting structures is substantially as shown in Kirk U. S. Patent 2,519,051, granted August 15, 1950, for "Electric Heating Appliance" and assigned to my present assignee. The deep well cooker and its above described accessories therefore form no part of the present invention.

As best shown in Fig. 3, the spaced upper ledges 4 are arranged to provide the diametrically opposite gaps 23 through which the heating unit will pass if it is canted slightly, as fully explained in the said Kirk patent.

Manufacturers of ranges having deep well cookers ordinarily provide a cooking vessel suitably sized for use with the heating element 5 in either of its operative positions. Such a cooking vessel 24 may have a flange formed with a groove 25 to receive and support a cover or lid 26 embodying the invention herein. As best shown in Fig. 4, lid 26 is of generally convex shape having the outermost rim 27 and a central depression 28 within which is located a knob or handle 29. Such handle is advantageously of a moldable thermosetting plastic material havinng relatively low thermal conductivity.

According to a first form of the invention, the cooking vessel lid 26 is provided with means for grasping the heating unit to provide for manually moving the heating unit from one to the other of its positions with respect to the deep well cooker 2. At the center of the cover 26, immediately below the handle 29, I affix the lifting unit 30. As best shown in Fig. 7, the unit comprises a generally cylindrical structure having inwardly disposed tabs 31 through which machine screws, self-tapping screws, or the like 32 pass into the handle 29, as indicated in Fig. 4. The handle, cover, and lifting unit are thus fastened together as a single structure. The lifting unit has a plurality of hook portions, each including the axially extending leg 33 and terminating in the angularly extending hook 34. Each hook portion extends in the same direction about the cylindrical structure, and it will be understood that the upper edge of each hook portion is in a common horizontal plane. Heating element support spiders are usually either three-armed or four-armed, and it is prefered to form the lifting unit with one hook portion for each of the arms of the spider. For the illustrated four-armed spider, therefore, the lifting unit has four hook portions. The hook portions extend about a circle of smaller diameter than the opening defined by the inntermost convolution of heating element 14; and in constructions where, as shown, there is a central medallion or trim cap 22, the lifting unit is sized to fit over the cap with relatively small clearance, as illustrated in Figs. 4 and 5. The cap 22 will therefore serve as a pilot or guide for the passage of the lifting unit.

In using the combined cover and lifting unit to raise the heating unit from its Fig. 2 to its Fig. 4 position, the cooking vessel 24 will, of course, have been removed from the well. The cover 26 is then grasped by the handle 29 and brought down against the heating unit, during which operation the respective leg portions 33 and hooks 34 will pass between the several arms of the support spider. When the cover 26 reaches a home position in which its rim 27 rests upon the flange 8 of the heating unit, the upper surface of each hook 34 will be below the bottom edge of the spider arms. Then by rotating the cover, the hooks will be brought under the spider arms and the heating unit engaged for lifting. It has been noted that the heating unit must be canted in order to pass through the gaps 23. The stability afforded by the relatively large diameter cover permits canting to any necessary degree while maintaining control of the heating unit. When the heating unit is raised completely out of the deep well 2, it is then restored to the horizontal plane and lowered until the rim portion 8 seats upon the ledges 4. The lifting device may then be rotated in an opposite direction and the hooks thereby disengaged from the spider arms. It should be noted that the engagement of the tubular sheath 21 with the side walls of the slot 20 holds the heating unit against rotation during the time when the lifting unit is being rotated for engagement or disengagement of the heating unit.

I prefer to incorporate the unit as a part of the cooking vessel lid for the primary reason that there is then almost no possibility of the lifting unit becoming lost. I have shown in Fig. 8, however, a second embodiment in which the handle 29 and lifting unit 30 are associated with a convex plate 36. Said plate preferably has a diameter and depth of convexity which will provide an insulating air space of substantial depth and volume. The small extent of line contact between the edge of plate 36 and the heating unit 14 and the usually very brief duration of such contact will not raise the temperature of the plate to an uncomfortable degree.

While there has been described what is at present considered to be the preferred embodiment of the invention, it will be understood that various modifications may be made therein, and it is intended to cover in the appended claims all such modifications as fall within the true spirit and scope of the invention.

I claim:

1. In combination, an electric range having a cooking top provided with a well, a substantially circular heating unit disposed in said well and movable between operative positions at the bottom and at the top of said well, said heating unit including spaced supporting elements, a cooking vessel for use with said heating unit in either of its operative positions, a cover for said vessel, said cover being smaller in diameter than said well, and a plurality of hook members fixed to the underside of said cover and extending downwardly therefrom to below the rim thereof for engagement with the underside of said supporting elements centrally of said heating unit to provide for manually moving said heating unit from one to the other of its said operative positions.

2. In combination, an electric range having a cooking top provided with a well, a substantially circular heating unit disposed in said well and movable between operative positions at the bottom and at the top of said well, said heating element including a plurality of supporting elements extending substantially radially from a common juncture at the center of said heating unit, a cooking vessel cover having a diameter less than said well, means including a plurality of rigid hook members fixed to the underside of said cover and extending axially therefrom for passage between said heating unit support elements and engagement with the underside thereof immediately about said juncture to provide for manually moving said heating unit from one to the other of its said operative positions, and a handle for said cover, said handle being of low heat conductive material and disposed in alignment with said hook members.

3. In combination, an electric range having a cooking top provided with a well, a substantially circular heating unit disposed in said well and movable between operative positions at the bottom and at the top of said well, said heating element including a plurality of supporting elements extending substantially radially from the center portion thereof, said supporting elements being joined together at the center portion of said heating unit, and means for engaging said heating unit for manually moving the same between its respective operating positions, comprising a shield-like member having a diameter smaller than said heating unit, a plurality of rigid hook members fixed to said shield-like member and extending axially therefrom to substantially below the rim of said shield-like member to straddle said radially extending supporting elements and to engage the same on the underside thereof, and a handle for said shield-like member, said handle being of low heat-conductive material.

4. The combination according to claim 3, in which said shield-like member comprises a metal plate convex in the direction of said handle, whereby to interpose an air space of appreciable thickness between said plate and said heating unit when the hook members are brought into engagement with said support elements.

5. In combination, an electric range having a cooking top provided with a well, a heating unit disposed in said well and movable between operative positions at the bottom and at the top of said well, said heating unit including a plurality of rigid support members extending substantially radially from a central juncture and a sheathed heating element arranged on said support members in flat coil form, a cap member secured to the respective support members at the juncture thereof, and means for grasping said heating unit for moving the same manually between its respective operative positions, including a metallic shield-like member, a plurality of rigid hook members fixed to said shield-like member and extending axially therefrom to below said shield-like member, said hook members collectively defining a substantially cylindrical structure having an inside diameter slightly larger than the diameter of said cap member, said hook members being arranged to pass through the convolutions of said heating element and about said cap member for engagement with the underside of said support members, and a handle member fixed to said shield-like element on the opposite side thereof from said hook members.

6. In combination, an electric range including a plate-like heating unit movable vertically between two operative positions, said heating unit including a plurality of mutually spaced, rigid support members and a sheathed heating element arranged on said support members in flat coil form, and means for grasping said heating unit for moving the same manually between its respective operative positions, including a plurality of rigid hook members arranged to pass through the central portion of said heating element for engagement with the underside of said support members, a handle, and a plate member between said handle and said hook members, said handle, plate member and hook members being integrated into a unitary assembly.

References Cited in the file of this patent

UNITED STATES PATENTS

| | | |
|---|---|---|
| 2,485,698 | Chesser et al. | Oct. 25, 1949 |
| 2,548,158 | Henyan | Apr. 10, 1951 |
| 2,568,973 | Snow | Sept. 25, 1951 |
| 2,630,518 | Brehm | Mar. 3, 1953 |

FOREIGN PATENTS

| | | |
|---|---|---|
| 127,125 | Great Britain | June 14, 1918 |
| 392,304 | Great Britain | May 18, 1933 |